(12) United States Patent
Nishiyama et al.

(10) Patent No.: US 7,847,754 B2
(45) Date of Patent: Dec. 7, 2010

(54) IMAGE PROCESSING PROGRAM AND IMAGE DISPLAY DEVICE

(75) Inventors: Akinori Nishiyama, Tokyo (JP); Yukihiro Higashi, Toyonaka (JP); Takaya Yamane, Toyonaka (JP); Masato Shimizu, Toyonaka (JP)

(73) Assignee: Kabushiki Kaisha Sega, Tokyo (JP)

( * ) Notice: Subject to any disclaimer, the term of this patent is extended or adjusted under 35 U.S.C. 154(b) by 1012 days.

(21) Appl. No.: 11/411,852

(22) Filed: Apr. 27, 2006

(65) Prior Publication Data
US 2007/0252779 A1    Nov. 1, 2007

(51) Int. Cl.
*G09G 5/00* (2006.01)
(52) U.S. Cl. .................... 345/1.1; 345/156
(58) Field of Classification Search ............. 345/1.1, 345/1.3, 642, 156
See application file for complete search history.

(56) References Cited

U.S. PATENT DOCUMENTS

2006/0033712 A1*  2/2006  Baudisch et al. ............ 345/157

* cited by examiner

*Primary Examiner*—Amare Mengistu
*Assistant Examiner*—Randal Willis
(74) *Attorney, Agent, or Firm*—Finnegan, Henderson, Farabow, Garrett & Dunner, L.L.P.

(57) ABSTRACT

The program of the present invention is an image processing program for causing a computer to display images using a plurality of display devices, wherein the image processing program causes the computer to perform the steps of: (a) dividing a virtual space into a plurality of areas; (b) associating display device selection information with each of the plurality of areas for selecting on which of the plurality of display devices an image is to be displayed; (c) judging in which of the plurality of areas a mobile object existing in the virtual space is positioned; (d) acquiring the display device selection information associated with the area in which the mobile object is positioned; and (e) displaying the mobile object in a display device corresponding to the display device selection information acquired at step (d) among the plurality of display devices.

10 Claims, 14 Drawing Sheets

IMAGE PROCESSING PROGRAM AND IMAGE DISPLAY DEVICE

BACKGROUND

The present invention generally relates to image processing technology of game devices and the like, and specifically relates to image generation technology and image display technology in a game device or the like having two or more display screens.

Game devices and similar image display devices having two or more display screens are known. With this kind of game device, by utilizing the feature of having a plurality of display screens, for instance, an image containing the behavior of characters or the like according to a player's operational command is displayed on one screen, and an image containing various information (for instance, attribute information of characters) relating to the game content deployed in the foregoing one screen is displayed on the other screen. Further, there are devices that display a virtual space in which the character moves across a plurality of display screens. Nevertheless, conventionally, the images displayed on the respective display screens were static. Thus, technology capable of dynamically representing the behavior of characters and the like is being sought.

SUMMARY

Thus, an object of the present invention is to provide image processing technology capable of dynamically representing the behavior of characters and the like.

The image processing program according to the present invention is an image processing program for causing a computer to display images using a plurality of display devices, wherein the image processing program causes the computer to perform the steps of: (a) dividing a virtual space into a plurality of areas; (b) associating display device selection information with each of the plurality of areas for selecting on which of the plurality of display devices an image is to be displayed; (c) judging in which of the plurality of areas a mobile object existing in the virtual space is positioned; (d) acquiring the display device selection information associated with the area in which the mobile object is positioned; and (e) displaying the mobile object in a display device corresponding to the display device selection information acquired at step (d) among the plurality of display devices.

Further, the image processing program according to the present invention is also an image processing program for displaying images using a plurality of display screens, wherein the image processing program causes the computer to perform the steps of: (a) setting a plurality of areas in a two-dimensional or three-dimensional virtual space; (b) judging in which of the plurality of areas coordinates of a mobile object existing in the virtual space belong; (c) displaying an image containing the mobile object, when the mobile object belongs to an Nth (N is an integral number) area among the plurality of areas based on the coordinates of the mobile object, as an image to be displayed on the Nth display screen among the plurality of display screens; (d) generating an image to be displayed on the plurality of display screens other than the Nth display screen; and (e) displaying images generated at steps (c) and (d) respectively on the plurality of display screens.

Preferably, the generation of images at steps (c) and (d) is performed with a plurality of image generation units arranged in the same direction as the alignment direction of the plurality of display screens.

The image display device according to the present invention is also an image display device for displaying images using a plurality of display devices, including: an area setting unit for dividing a virtual space into a plurality of areas; an association setting unit for associating display device selection information with each of the plurality of areas for selecting on which of the plurality of display devices an image is to be displayed; a position judgment unit for judging in which of the plurality of areas a mobile object existing in the virtual space is positioned; a selection information acquisition unit for acquiring the display device selection information associated with the area in which the mobile object is positioned; and a display control unit for displaying the mobile object in a display device corresponding to the display device selection information acquired with the selection information acquisition unit among the plurality of display devices.

Further, the image display device according to the present invention is also an image display device for displaying images using a plurality of display screens, including: an area setting unit for setting a plurality of areas in a two-dimensional or three-dimensional virtual space; a position judgment unit for judging in which of the plurality of areas coordinates of a mobile object existing in the virtual space belong; a first image generation unit displaying an image containing the mobile object, when the mobile object belongs to an Nth (N is an integral number) area among the plurality of areas based on the coordinates of the mobile object, as an image to be displayed on the Nth display screen among the plurality of display screens; a second image generation unit for generating an image to be displayed on the plurality of display screens other than the Nth display screen; and a display control unit for displaying images generated with the first and second image generation units respectively on the plurality of display screens.

Preferably, the first and second image generation units are arranged in the same direction as the alignment direction of the plurality of display screens.

DETAILED DESCRIPTION

A portable game machine 1 as an embodiment employing the present invention is now explained. Incidentally, the configuration of the portable game device 1 explained below is merely an exemplification, and is not intended to limit the present invention.

Figure 1:
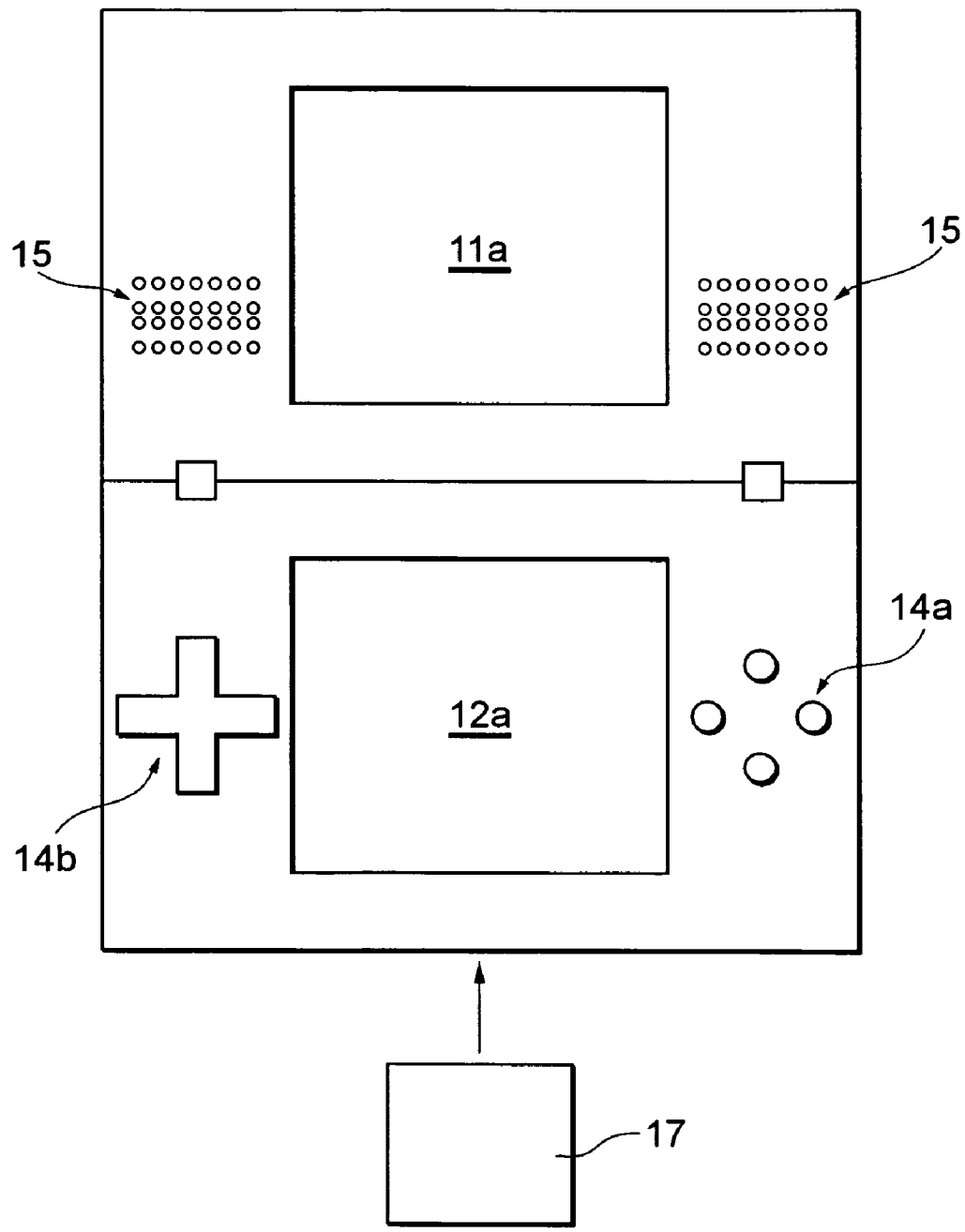
FIG. 1 is an external view of a portable game machine.

FIG. 1 is an external view of the portable game machine. As shown in FIG. 1, the portable game machine 1 is configured by including a first display screen 11a, a second display screen 12a, four buttons 14a and an arrow key 14b as input devices for an operator to input operational commands, and a speaker 15 for outputting sound effects and the like. A cartridge 17 as a storage medium storing a game program is loaded into this portable game machine 1. The surface of the second display screen 12a is covered with a touch panel not shown.

Figure 2:
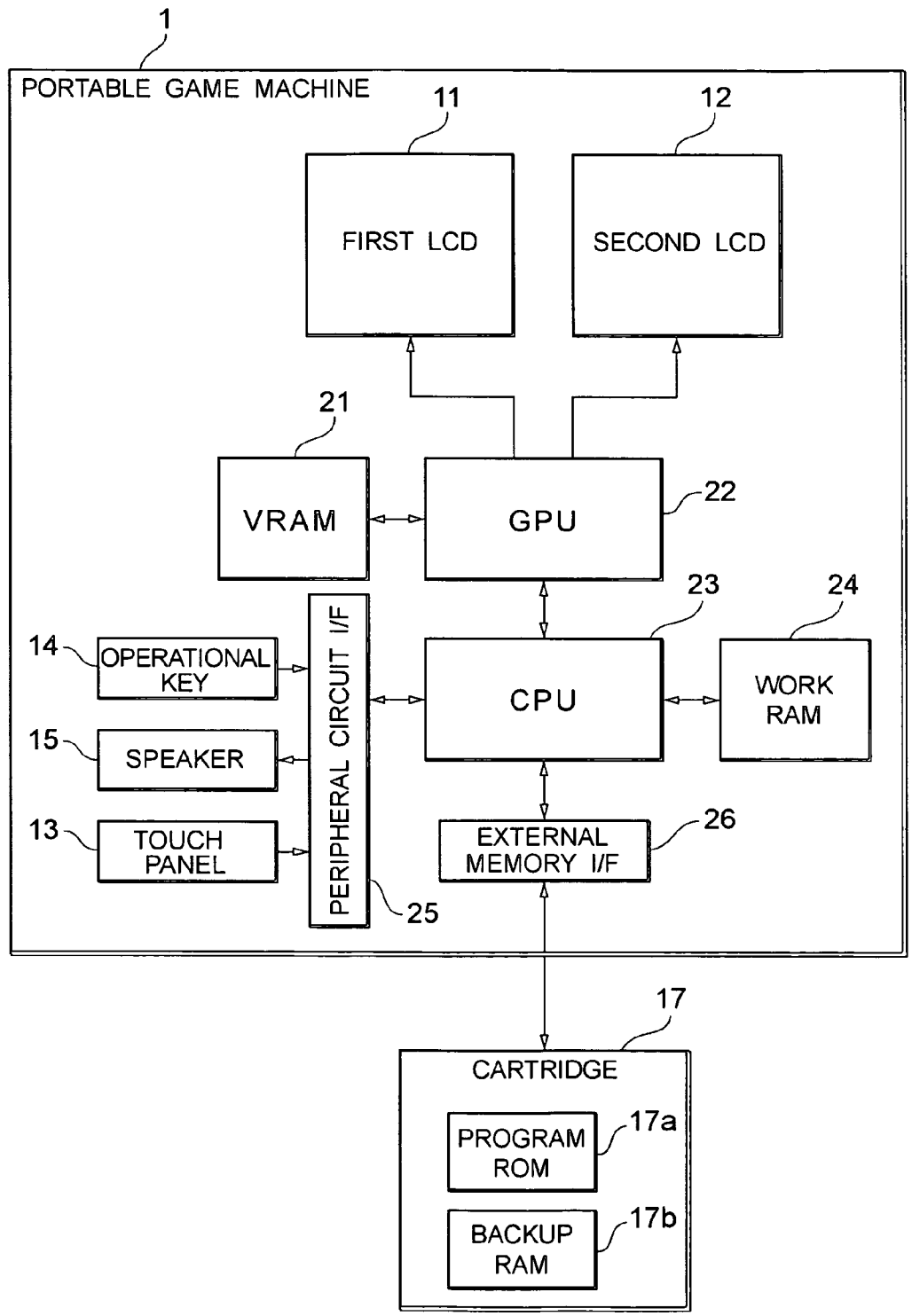
FIG. 2 is a block diagram showing a detailed configuration of the portable game machine.

FIG. 2 is a block diagram showing a detailed configuration of the portable game machine. As shown in FIG. 2, the portable game machine 1 is configured by including a first LCD (liquid crystal display device) 11, a second LCD 12, a touch panel 13, an operational key 14, a speaker 15, a VRAM 21, a GPU (image processor) 22, a CPU (central processor) 23, a work RAM (work memory) 24, a peripheral circuit I/F (interface) 25, and an external memory I/F (interface) 26. The VRAM 21, GPU 22, CPU 23 and work RAM 24 configure a computer for executing the game program.

The GPU 22, according to a command from the CPU 23, generates a game image to be output to and displayed on the first LCD 11 and second LCD 12 using the VRAM 21, and displays the generated game image on the first display screen 11a of the first LCD 11 and the second display screen 12a of the second LCD 12. More specifically, the GPU 22 is configured by including a geometry engine for operating the respective apexes of a 3-dimensional model based on 3-dimensional model data, a rendering engine for generating a game image from a 3-dimensional model disposed in the virtual space, and a 2-dimensional rendering engine for generating a game image based on 2-dimensional image data representing a character and 2-dimensional image data representing the background.

The CPU 23 is electrically connected to the external memory I/F 26, and the cartridge 17 is loaded into this external memory I/F 26. The cartridge 17 is a storage medium for storing a game program. This cartridge 17 contains a program ROM 17a for storing the game program, and a backup RAM 17b for rewritably storing the backup data. The game program stored in the program ROM 17a of the cartridge 17 is loaded into the work RAM 24. The game program loaded into the work RAM 24 is executed by the CPU 23. Incidentally, in the present embodiment, although a case is explained where the game program is supplied from an external storage medium to the portable game machine 1, the game program may be stored in a nonvolatile memory built in the portable game machine 1 beforehand, or supplied to the portable game machine 1 through a wired or wireless communication circuit.

The work RAM 24 temporarily stores the game program to be executed by the CPU 23 or the operation results of the CPU 23.

The peripheral circuit I/F 25 is a circuit for sending and receiving data to and from external I/O devices such as the touch panel 13, operational key 14 (buttons 14a, arrow key 14b) and speaker 15, and the CPU 23. The touch panel 13 (including device drivers for touch panels) is used for outputting coordinate data corresponding to a position input (designated) with a stylus not shown.

Incidentally, to explain the correspondence of the present invention and the present embodiment, the CPU 23 corresponds to the "area setting unit", "association setting unit", "position judgment unit", and "selection information acquisition unit", the GPU 22 corresponds to the "first image generation unit" and "second image generation unit", the VRAM 21 and GPU 22 correspond to the "display control unit", and the first LCD 11 and second LCD 12 correspond to the "display device".

Next, the map and area data contained in the game program of the present embodiment are explained in detail.

Figure 3:
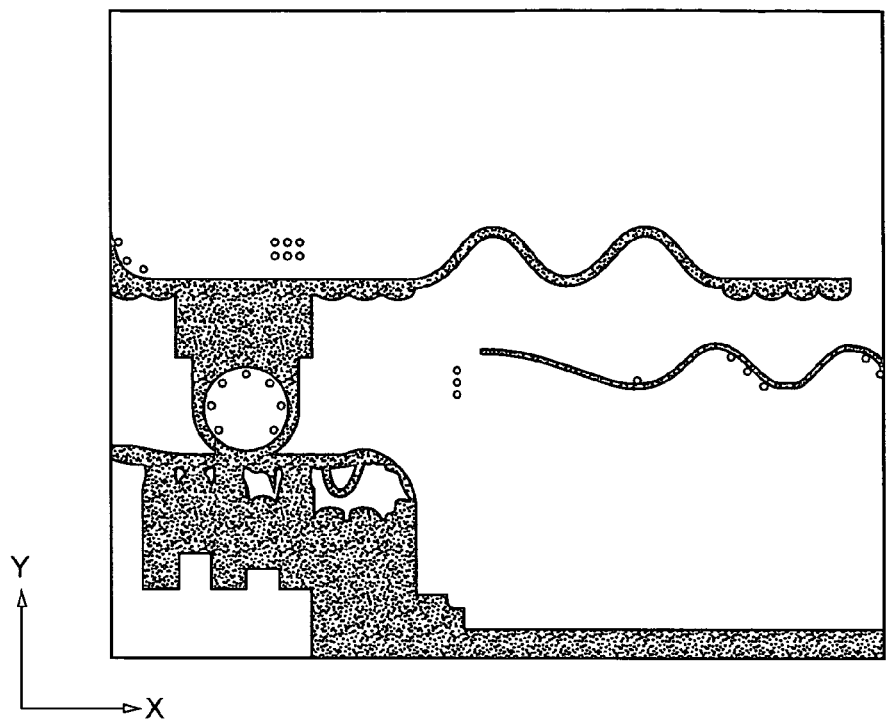
FIG. 3 is a diagram showing an example of a map in a virtual space.

FIG. 3 is a diagram showing an example of a map in the virtual space. Here, "map" is used to prescribe the basic movable range of characters in the virtual space. In the illustrated example, characters are basically able to move in two directions; namely, the horizontal direction (X direction) and vertical direction (Y direction) in the range displayed in white in the map. Further, depending on the game contents, various gimmicks may be disposed in the map. A gimmick is something that is disposed in the map and exerts a specific effect on the character; for example, a spring or jump would be a gimmick. There are gimmicks that are not displayed on the screen (for instance, a scroll gimmick). All of these gimmicks are disposed on the map.

Figure 4:
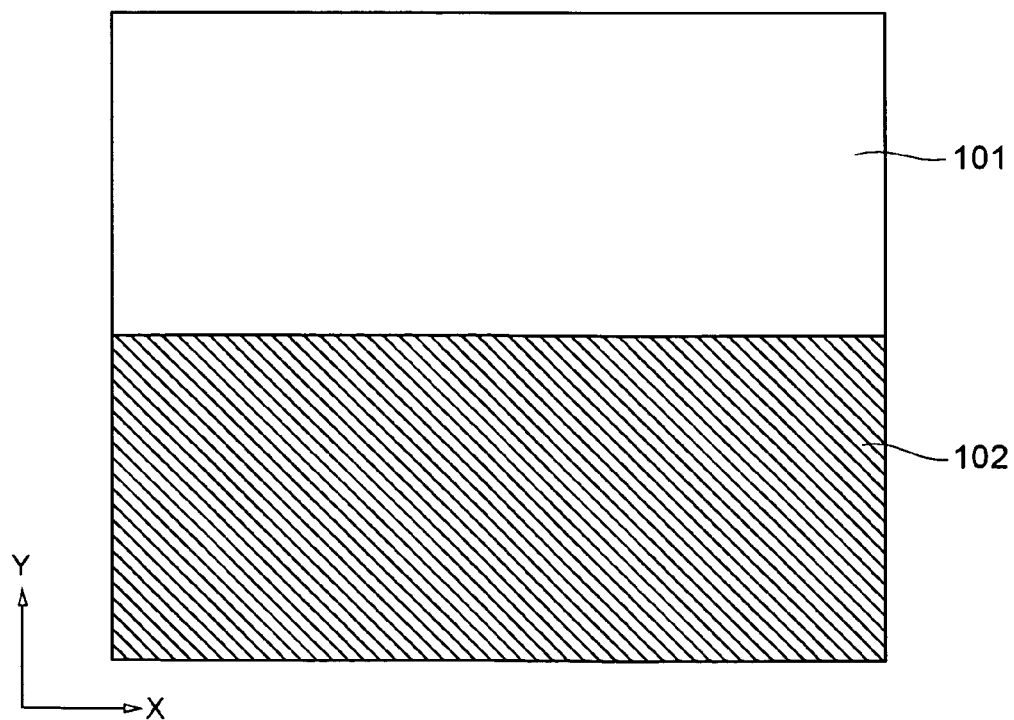
FIG. 4 is a diagram showing an example of area data.

FIG. 4 is a diagram showing an example of area data. Here, "area data" is data (display device selection information) provided for prescribing where to display the character; that is, whether to display the character on the first display screen 11a or second display screen 12a. The area data in the illustrated example is created in a size corresponding one-on-one to the map shown in FIG. 4, and is divided into a first area 101 (upper area shown in white in FIG. 4) and second area 102 (lower area shown with diagonal lines in FIG. 4) in the virtual space. The area data shown in FIG. 4 is configured from two areas divided relatively simply into an upper area and lower data. Incidentally, the white color and diagonal lines shown in FIG. 4 are used for the sake of convenience, and there is no special meaning in such white color or diagonal lines.

Figure 5:
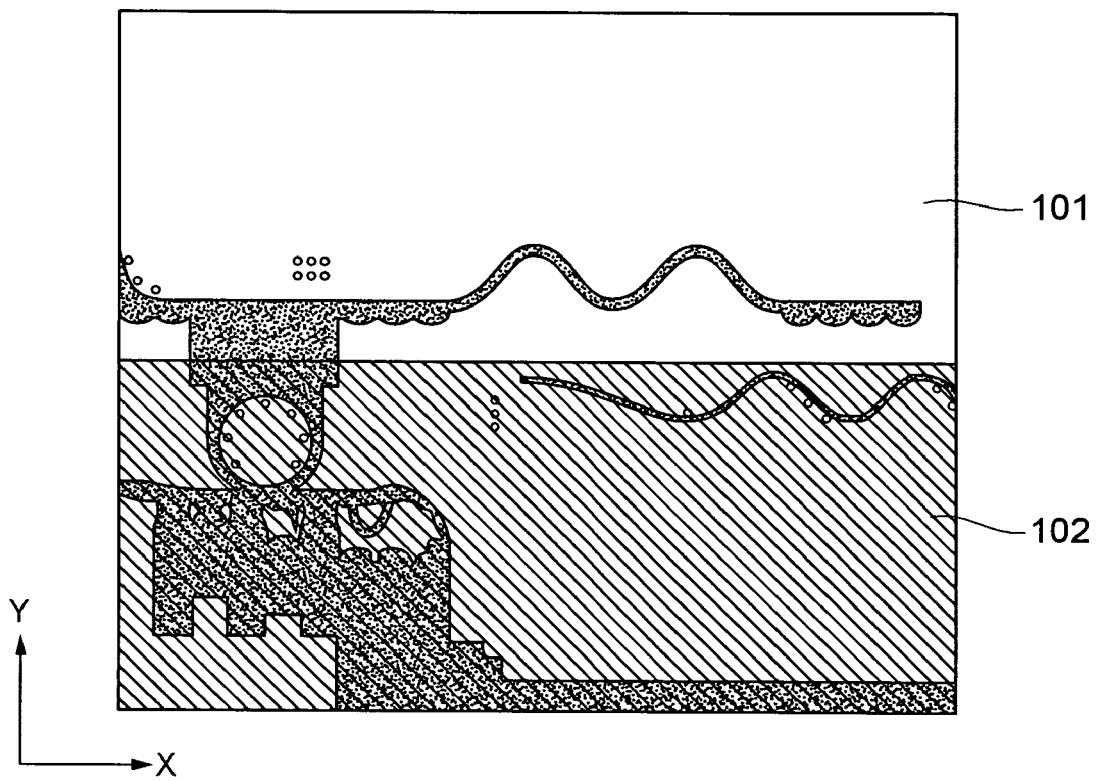
FIG. 5 is a diagram showing a state where the map shown in FIG. 3 and the area data shown in FIG. 4 are overlapped.

FIG. 5 is a diagram showing a state where the map shown in FIG. 3 and the area data shown in FIG. 4 are overlapped. Although a character operated by an operator is able to freely move on the map, by referring to the area data at such time, it is possible to determine whether to display the character on the first display screen 11a or second display screen 12a. In this example, when the character position is disposed in the first area 101, such character is displayed on the first display screen 11a, and when the character position is disposed in the second area 102, such character is displayed on the second display screen 12a. The display examples will be described later.

Figure 6:
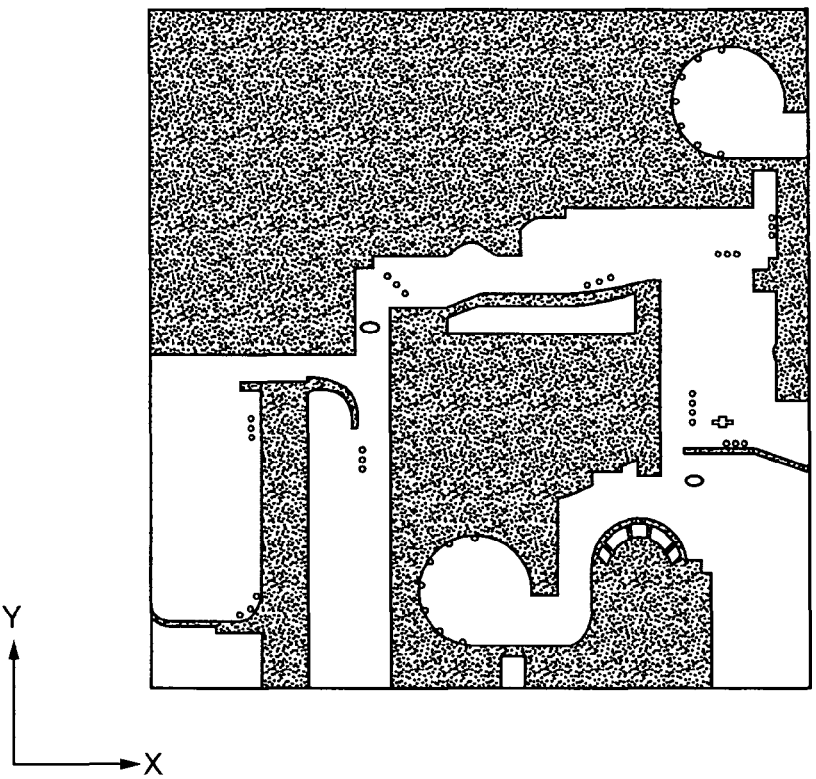
FIG. 6 is a diagram showing another example of a map in the virtual space.
Figure 7:
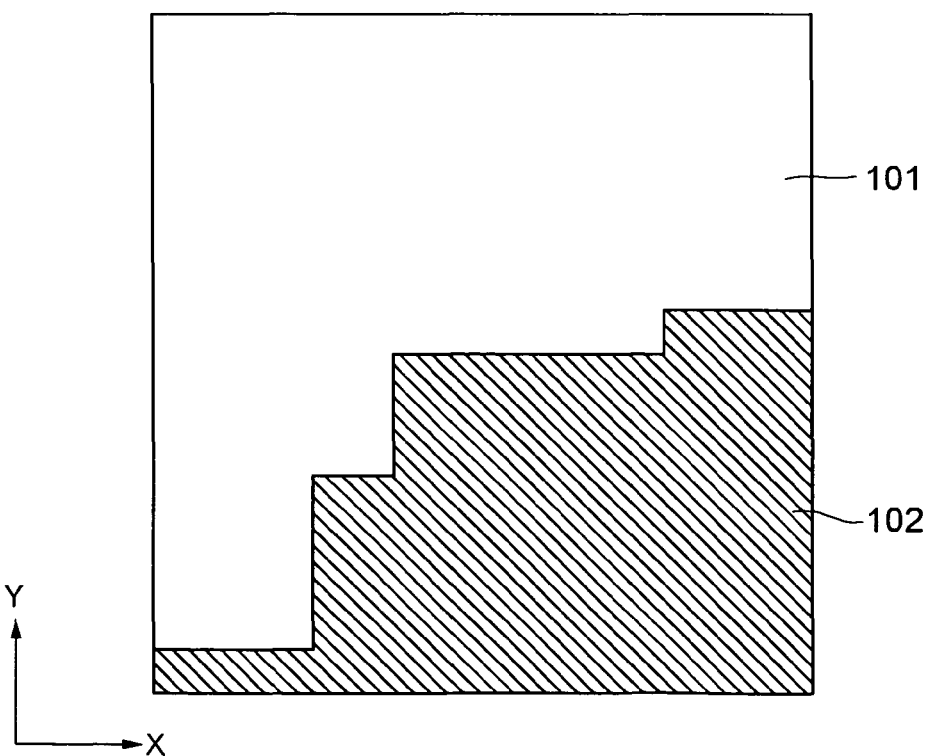
FIG. 7 is a diagram showing an example of area data created in correspondence with the map shown in FIG. 6.
Figure 8:
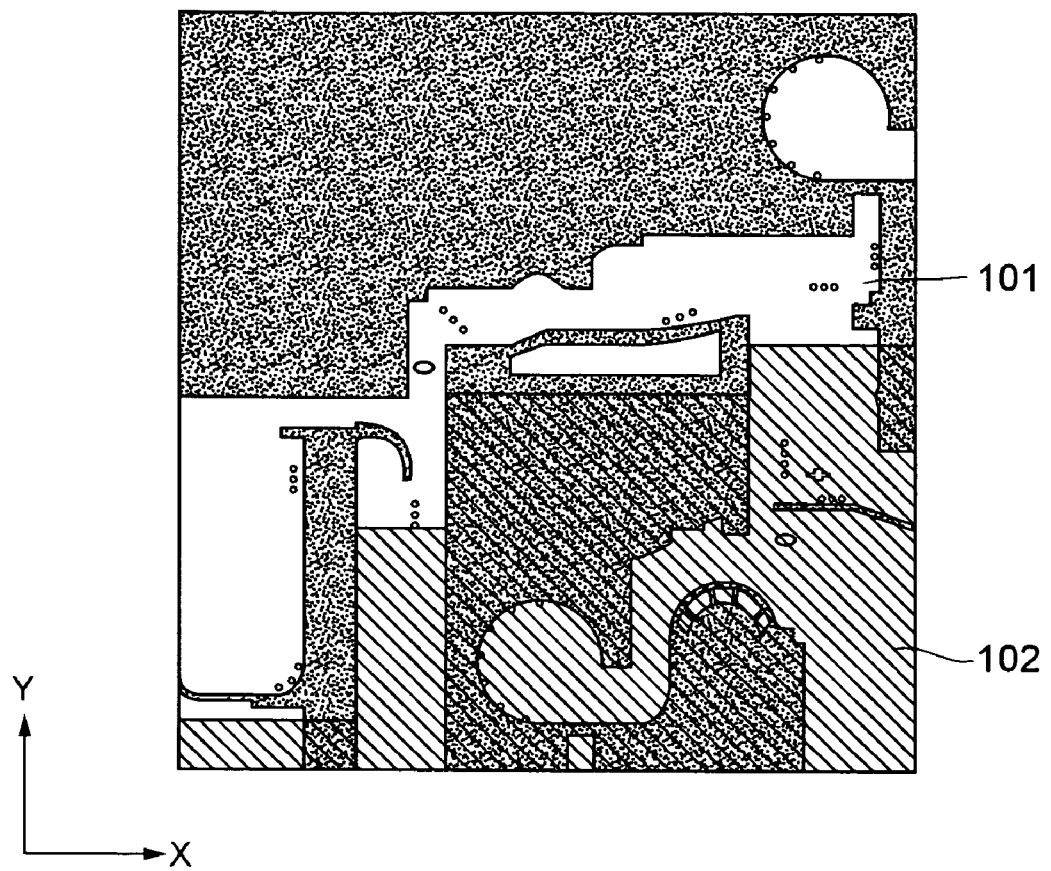
FIG. 8 is a diagram showing a state where the map shown in FIG. 6 and the area data shown in FIG. 7 are overlapped.

FIG. 6 is a diagram showing another example of a map in the virtual space. FIG. 7 is a diagram showing an example of area data created in correspondence with the map shown in FIG. 6. FIG. 8 is a diagram showing a state where the map shown in FIG. 6 and the area data shown in FIG. 7 are overlapped. The boundary line of the first area 101 and second area 102 in the area data does not necessarily have to be a straight line, and may also be a broken line as shown in FIG. 7, or freely set in other shapes (for example, in a curved line).

Incidentally, the map and area data are not limited to being created individually, and may also be created integrally.

Next, operation of the portable game machine 1 in the present embodiment is explained in detail. Incidentally, in the following explanation, among the various characters appearing in the virtual space, when referring to a character in which the behavior changes according to the operational command input by the operator using the operational key 14, such character is referred to as a "player character".

Figure 9:
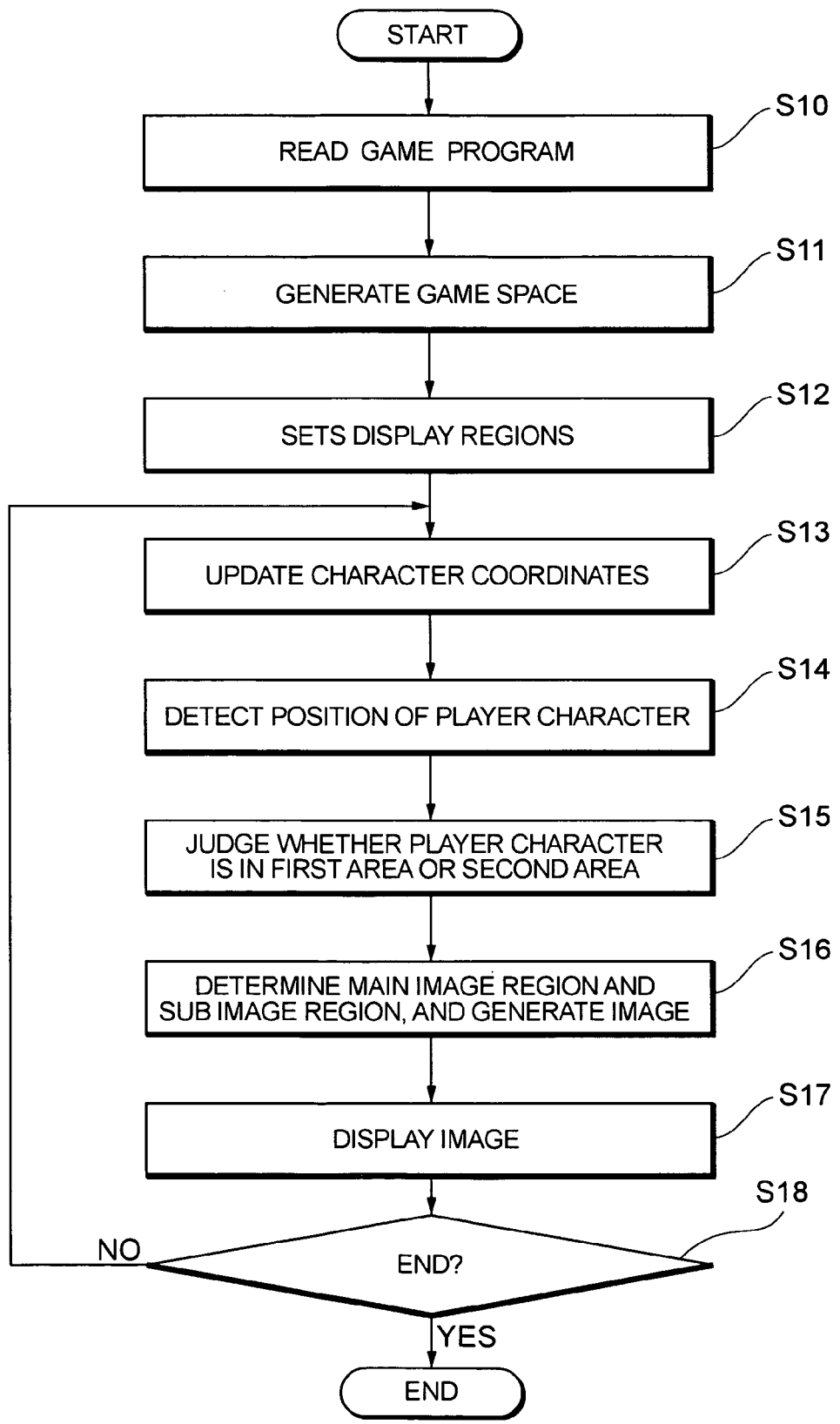
FIG. 9 is a flowchart for explaining the operational procedures of the portable game machine.
Figure 10:
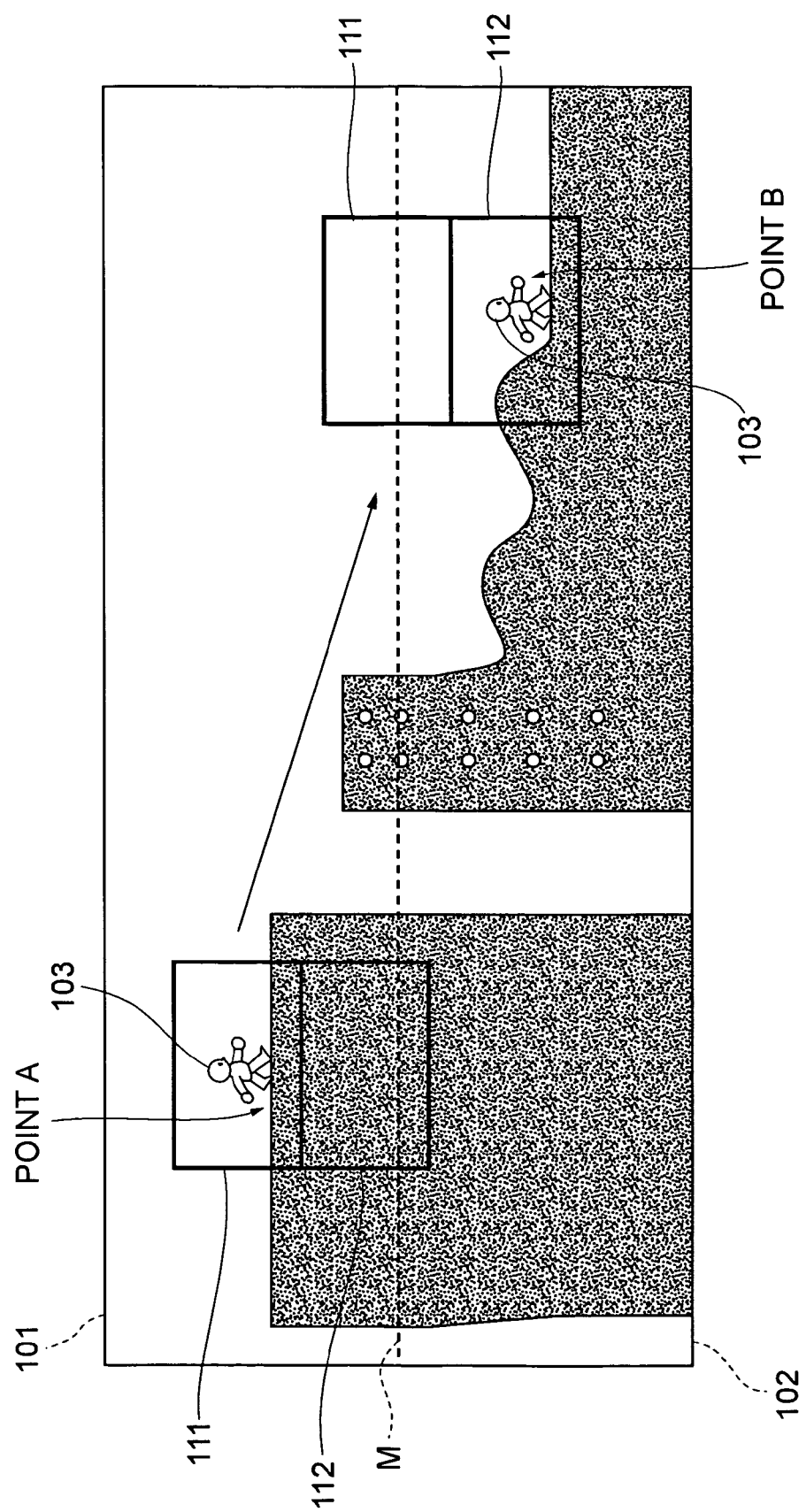
FIG. 10 is a map showing a simplification for facilitating the explanation of image generation processing.

FIG. 9 is a flowchart for explaining the operational procedures of the portable game machine. Incidentally, in this flowchart, the explanation will be mainly provided concerning image generation processing, and explanation on other operation processing (for instance, impact judgment) relating to the game presentation is omitted. FIG. 10 is a map showing a simplification for facilitating the explanation of image generation processing. For example, a case is considered where the player character 103 moves in the virtual space from point A toward point B shown in FIG. 10. Further, with the map shown in FIG. 10, the boundary line M shown with the dotted line is the boundary, and the area data is set with the upper part thereof as the first area 101, and the lower part thereof as the second area 102.

The CPU 23 reads a game program from the cartridge 17 (step S10). This game program contains various programs for performing game presentation and incidental data. The foregoing map and area data are also contained in the game program. The game program (including the map and area data) read by the CPU 23 is retained in the work RAM 24.

Next, the CPU 23 executes the game program stored in the work RAM 24, and generates a game space as the virtual space (step S11). Specifically, the CPU 23 reads the map and overlaps the area data thereon to generate a game space, and models of the player character 103 and enemy character (not shown in FIG. 10) are suitably disposed in this game space.

Incidentally, at step S11, the processing of executing the game program and configuring the game space based on the map and area data corresponds to the processing of dividing a virtual space into a plurality of areas, as well as to the processing of associating display device selection information with each of the plurality of areas for selecting on which of the plurality of display devices an image is to be displayed in the present invention.

Next, the CPU 23 sets the first display region and second display region to be disposed in association with the alignment direction of the first display screen 11a and second display screen 12a (step S12). Here, the first display region and second display region are virtual display regions for displaying the inside of the virtual two-dimensional space. In the present embodiment, since the first display screen 11a and second display screen 12a are aligned in the vertical direction (refer to FIG. 1), the first display region 111 and second display region 112 are disposed as shown in FIG. 10 in correspondence with such alignment direction (vertical direction). The first display region 111 and second display region 112 primarily follow the player character 103 and move in a broad map. Thereby, an image in a specific portion in which the player character 103 in the map exists is generated, and displayed on the first display screen 11a and second display screen 12a. Incidentally, in this embodiment, although a case is explained regarding the display region in a virtual two-dimensional space in two display screens, this may also be three or more display screens, and a plurality of projection planes may be displayed with a plurality of virtual cameras in a virtual three-dimensional space.

Next, the CPU 23 updates the coordinates of the respective characters (step S13). Specifically, the CPU 23 updates the positional coordinates of the player character 103 based on the contents (operational key data) of the operational command input using the operational key 14. Further, the CPU 23 suitably updates the positional coordinates based on a prescribed algorithm regarding the enemy characters and the like.

Next, the CPU 23 detects the position of the player character 103 in the game space (virtual space) (step S14).

Next, the CPU 23 judges whether the player character 103 belongs to the first area 101 or second area 102 based on the area data and the position of the player character 103 detected at step S14 (step S15). For instance, when the player character 103 is at point A shown in FIG. 10, it is judged that the player character 103 belongs to the first area 101, and, when the player character 103 is at point B shown in FIG. 10, it is judged that the player character 103 belongs to second area 102.

Incidentally, the processing at foregoing step S15 corresponds to the processing of acquiring the display device selection information associated with the area in which the mobile object is positioned.

Next, the GPU 22 respectively determines the position of the main image region for displaying the player character 103 and the position of the sub image region for displaying the range adjacent to the range to be displayed by the main image region based on the judgment result at step S15, and generates images based on the respective display regions (step S16). The processing at this step is now explained in detail.

Foremost, image generation processing by the first display region 111 is explained. When the player character 103 belongs to the first area 101, an image projecting the first range containing the player character 103 in the game space is generated by the first display region 111. The example illustrated in FIG. 10 corresponds to a case where the player character 103 is at point A. The display region (image generation unit) generating this image of the first range containing the player character 103 is referred to as a "main image region". Meanwhile, when the player character 103 belongs to the second area 102, an image projecting the second range adjacent to the first range in the game space is generated by the first display region. The example illustrated in FIG. 10 corresponds to a case where the player character 103 is at point B. In this case, the second range is a range that is adjacent to the upper side of the first range. The display region (image generation unit) generating this image not containing the player character 103 is referred to as a "sub image region". The images generated by the first display region 111 are stored in the VRAM 21.

Next, image generation processing by the second display region 112 is explained. When the player character 103 belongs to the second area 102, an image projecting the first range containing the player character 103 in the game space is generated by the second display region 112. The example illustrated in FIG. 10 corresponds to a case where the player character 103 is at point B. In this example, the second display region 112 functions as the "main image region". Meanwhile, when the player character 103 belongs to the first area 101, an image projecting the third range adjacent to the first range in the game space is generated by the second display region. The example illustrated in FIG. 10 corresponds to a case where the player character 103 is at point A. In this example, the second display region 112 functions as the "sub image region". The images generated by the second display region 112 are stored in the VRAM 21.

Incidentally, the image generation processing routines performed respectively by the first display region 111 and second display region 112 are normally conducted in parallel. Further, the respective sizes of the first range to third range are set in correspondence with the respective sizes of the first display screen 11a and second display screen 12a.

Next, the GPU 22 displays on the first display screen 11a the image generated by the first display region, and displays on the second display screen the image generated by the second display region (step S17). Specifically, the GPU 22 reads the image stored in the VRAM 21, and respectively outputs this to the first LCD 11 and second LCD 12. Thereby, images are respectively displayed on the first display screen 11a of the first LCD 11 and the second display screen 12a of the second LCD 12.

Figure 11:
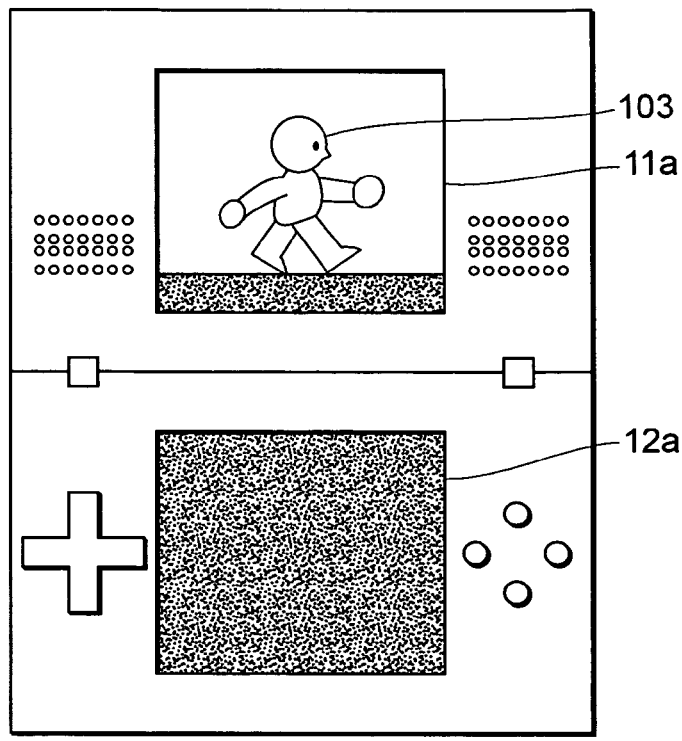
FIG. 11 is a diagram showing a specific example of an image display in the portable game machine.
Figure 12:
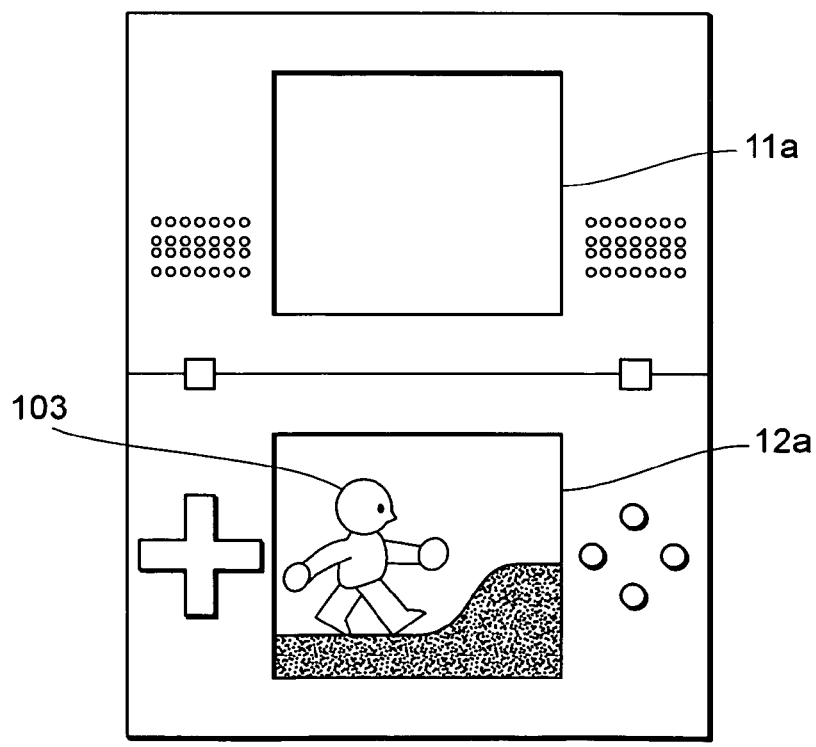
FIG. 12 is a diagram showing a specific example of an image display in the portable game machine.

FIG. 11 and FIG. 12 are diagrams showing specific examples of the image display of a portable game machine. FIG. 11 shows an image display example in a case when the player character 103 is at point A (refer to FIG. 10). In the example illustrated in FIG. 11, the image of the first range containing the player character 103 is displayed on the first display screen 11a, and the image of the second range adjacent to the first range is displayed on the second display screen 12a. FIG. 12 shows an image display example in a case when the player character 103 is at point B (refer to FIG. 10). In the example illustrated in FIG. 12, the image of the first range containing the player character 103 is displayed on the second display screen 12a, and the image of the third range adjacent to the first range is displayed on the first display screen 11a.

Next, the CPU 23 judges whether it is game over (step S18). When the game is to be continued (step S18: YES), the routine returns to step S13, and, when it is game over (step S18: NO), the processing sequence is ended.

A more preferable embodiment of the judgment processing at step S15 is now explained.

Figure 13:
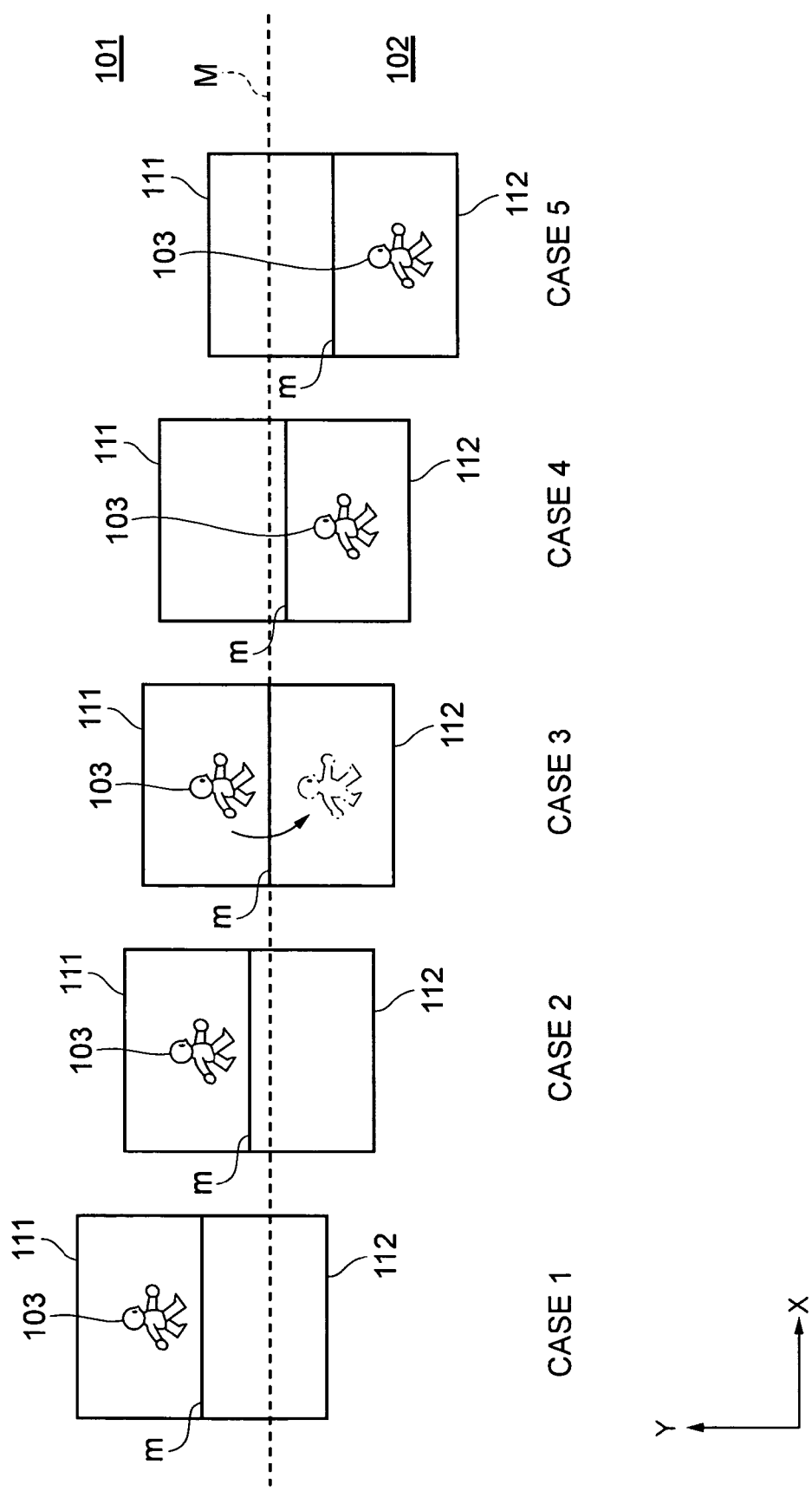
FIG. 13 is a diagram for explaining a preferable example of position judgment of a player character.

FIG. 13 is a diagram for explaining a preferable example of position judgment of the player character. As described in the foregoing embodiment, when the first display region 111 and second display region 112 move by following the player character 103, the position judgment of the player character 103 can be performed depending on whether the intermediate position of the first display region 111 and second display region 112 belongs to the first area 101 or second area 102. For instance, as an example of the intermediate position of the first display region 111 and second display region 112, the position of boundary line m of the first display region 111 and second display region 112 may be used, but is not limited thereto.

For example, in case 1 shown in FIG. 13, the boundary line m of the first display region 111 and second display region 112 is positioned above the boundary line M of the first area 101 and second area 102. In other words, the intermediate position of the first display region 111 and second display region 112 belongs to the first area 101. In this case, it is possible to judge that the player character 103 belongs to the first area 101. The same judgment can be made for case 2 shown in FIG. 13. Further, in case 4 shown in FIG. 13, the boundary line m of the first display region 111 and second display region 112 is positioned below the boundary line M of the first area 101 and second area 102. In other words, the intermediate position of the first display region 111 and second display region 112 belongs to the second area 102. In this case, it is possible to judge that the player character 103 belongs to the second area 102. The same judgment can be made for case 5 shown in FIG. 13.

Case 3 shown in FIG. 13 represents the process of making a transition from the status of case 2 to the status of case 4. When the intermediate position (position of boundary line m in this example) of the first display region 111 and second display region 112 exceeds the boundary line M of the first area 101 and second area 102, the first display region 111 that was functioning as the main image region functions as the sub image region, and the second display region 112 that was functioning as the sub image region functions as the main image region. In other words, the main image region and sub image region are switched. The switching of the main image region and sub image region may be conducted instantaneously, but it would be more preferable to once raise a switching request flag, and actually switch the display during the vertical blanking interval (V blank).

Further, it is also preferable to temporarily interrupt the movement (scroll) in the alignment direction of the first display region 111 and second display region 112 (Y direction in the present embodiment) upon switching the main image region and sub image region. The method for realizing this processing is explained below.

Figure 14:
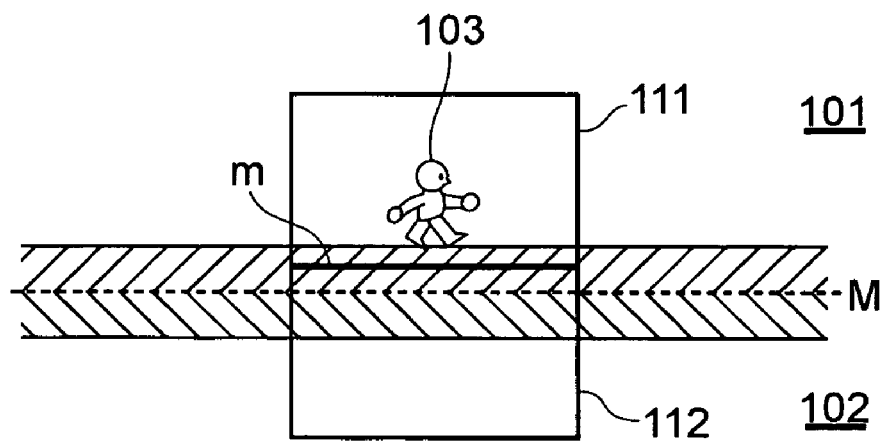
FIG. 14 is a diagram for explaining the processing for temporarily interrupting the camera movement upon switching cameras.
Figure 15:
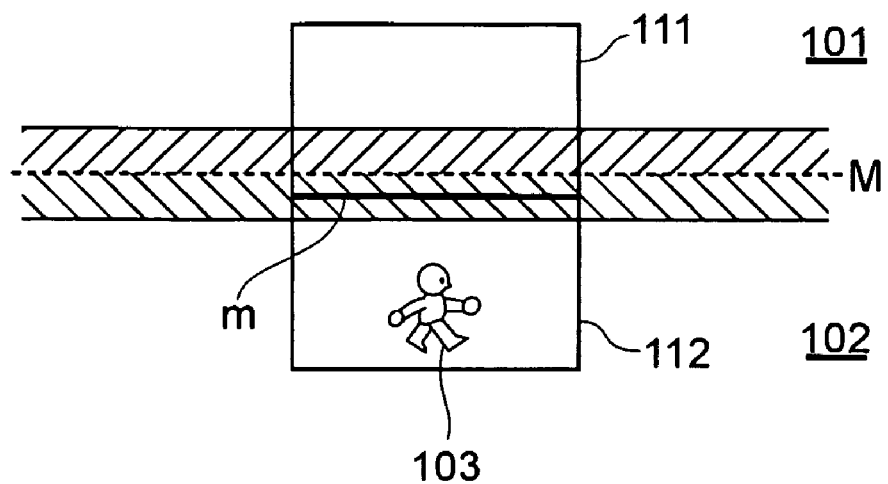
FIG. 15 is a diagram for explaining the processing for temporarily interrupting the camera movement upon switching cameras.

FIG. 14 and FIG. 15 are diagrams for explaining the processing of temporarily interrupting the movement during the switching of the main image region and sub image region. In this example, a switching region having a prescribed width is provided at the boundary of the first area 101 and second area 102. The switching region, for instance, as shown with the diagonal lines in FIG. 14 and FIG. 15, having a prescribed width is provided respectively to the upper part and lower part of the boundary line M of the first area 101 and second area 102. This switching region is contained in the foregoing area data. Preferably, the width of the switching region is set in correspondence with the physical distance (refer to FIG. 1) between the first display screen 11a and second display screen 12a. For instance, in the present embodiment, a switching region having a width corresponding to 40 dots on the respective display screens is provided above and below the boundary line M.

As shown in FIG. 14, when the intermediate position (position of boundary line m) of the first display region 111 and second display region 112 belongs to the switching region, scroll of the first display region 111 and second display region 112 in a specific direction (Y direction) corresponding to the alignment direction of the first display region 111 and second display region 112 is interrupted. Here, since the player character 103 is continuously moving, usually, the player character 103 is displayed at a specific position (near the center for example) within the screen as shown in FIG. 14, and, during the interruption of the scroll, the background image projected by the first display region 111 is temporarily fixed, and an image of the player character 103 moving upward in such fixed background image is displayed. And, when the player character 103 belongs to the camera switching region, since it will virtually exist in the gap between the first display screen 11a and second display screen 12a, there will be a timing when the player character 103 is not displayed on either of the display screens. Thereafter, an image of the player character 103 moving on the fixed background image projected by the second display region 112 is displayed. Subsequently, when the intermediate position of the first display region 111 and second display region 112 falls outside the camera switching region, scroll of the first display region 111 and second display region 112 in the Y direction is resumed. Incidentally, in the foregoing example, although a case was explained where the player character 103 moves from the first area 101 to the second area 102, the same applies to a case where the player character 103 moves from the second area 102 to the first area 101.

Incidentally, in the foregoing embodiment, although the first display region and second display region in the virtual two-dimensional space moved by following the player character, the character to be followed by the respective display regions is not limited to the player character. As examples of another character, for instance, considered may be a golf ball in a golf game, a tennis ball in a tennis game, a ball in a pinball game and so on, and various types of mobile objects capable of moving in the game space may be adopted. Further, in the foregoing embodiment, although a case was explained of displaying images using two display screens disposed in the vertical direction, the alignment direction of the display screens is not limited to the above, and may be aligned in the horizontal direction, oblique direction or the like. Moreover, the number of display screens is not limited to two, and three or more display screens may also be adopted. In such a case, for example, area data configured with the number of areas matching the number of display screens may be prepared.

Further, in the foregoing embodiment, although a case was explained of using a two-dimensional map, a three-dimensional map may also be used. Here, three-dimensional area data may be prepared. An example using such three-dimensional map is now explained. In conjunction with this, an example of using three display screens is also explained.

Figure 16:
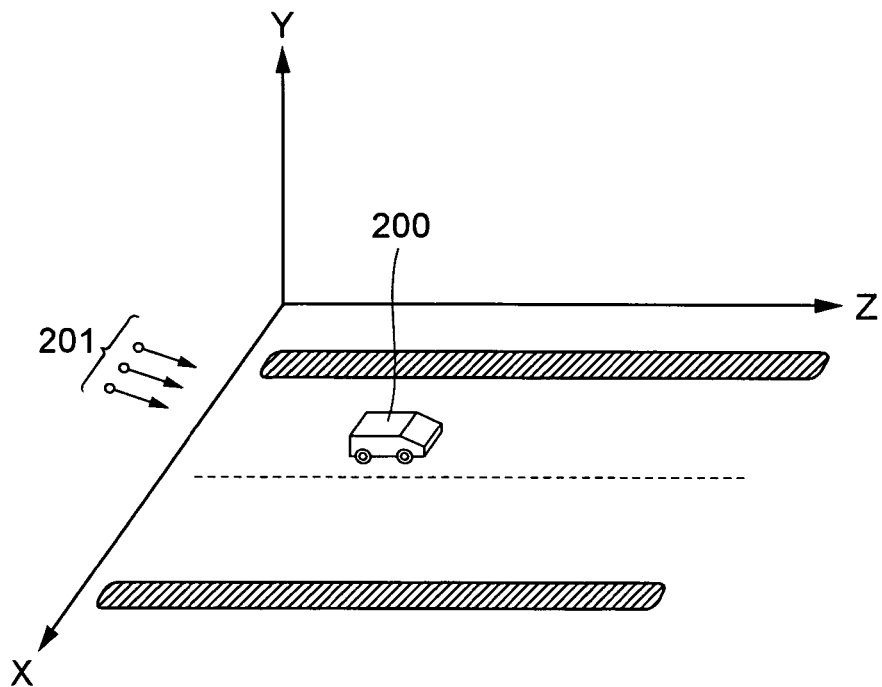
FIG. 16 is a view showing a frame format of a three-dimensional map.

FIG. 16 is a view showing a frame format of a three-dimensional map. As shown in FIG. 16, a three-dimensional map is prescribed with mutually independent axes (XYZ axes). In the illustrated example, a car race course is configured on the XZ plane, and a race car 200 as the mobile object runs on this XZ plane. Here, a camera (image generation unit) 201 for generating a two-dimensional image obtained by projecting a three-dimensional space on a prescribed projection plane, for instance, as shown in FIG. 16, is set obliquely upward behind the race car 200. In this example, since three display devices arranged in the horizontal direction are assumed, the three cameras 201 are arranged in a horizontal direction (corresponding to the X axis direction in FIG. 16) in correspondence with this alignment. The line of sight vector of the respective cameras 201 is facing the backside of the race car 200 as shown in FIG. 16.

Figure 17:
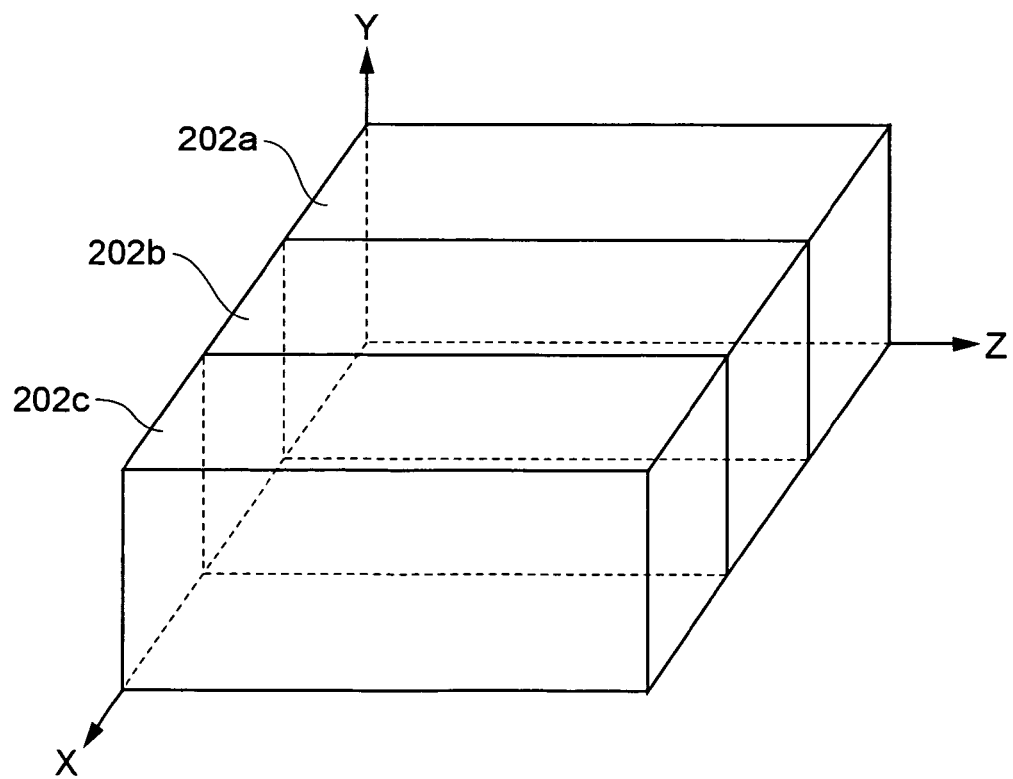
FIG. 17 is an example of three-dimensional area data.

FIG. 17 is an example of three-dimensional area data. In correspondence with the map shown in FIG. 16, the three-dimensional space is configured by being divided into three sections. In this example, since the X axis direction is in correspondence with the alignment direction of the three display devices, three area data 202a, 202b, 202c are also set along the X axis direction.

Figure 18:
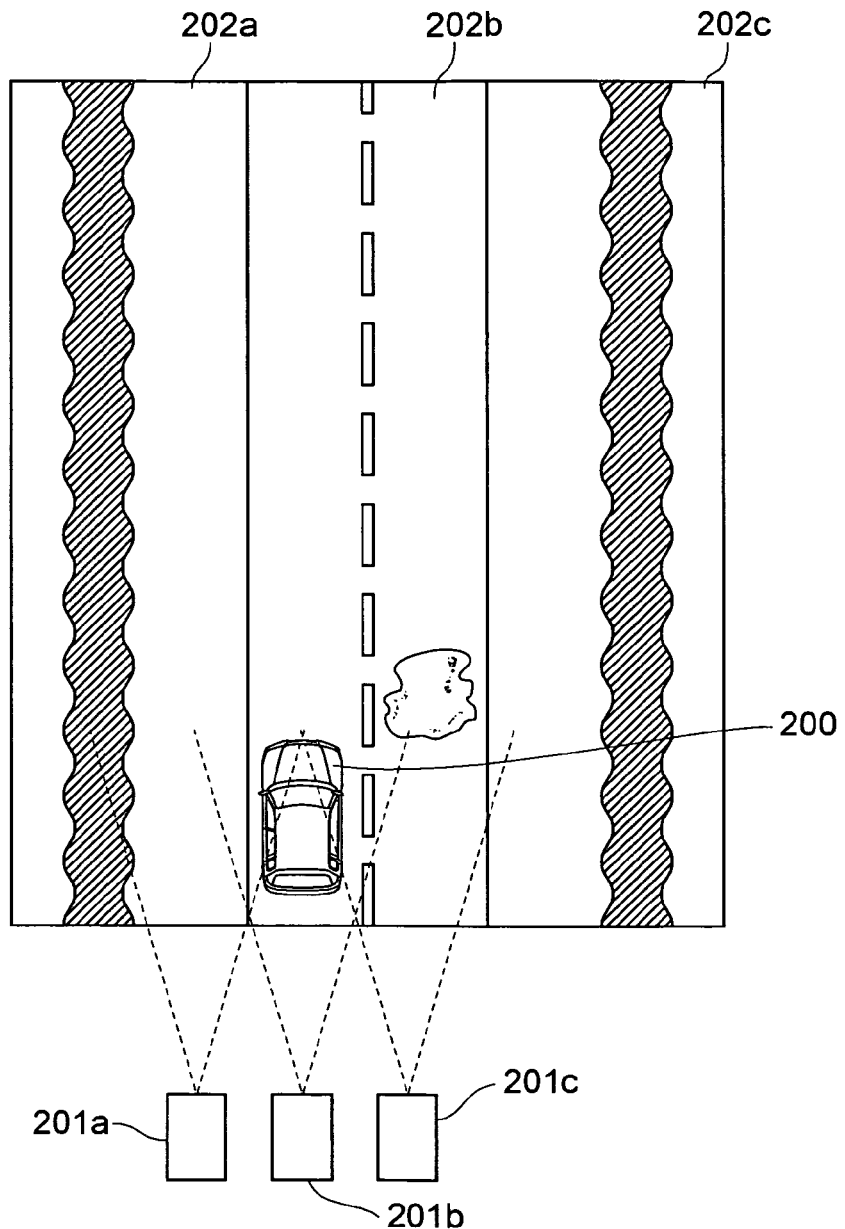
FIG. 18 is a diagram for explaining a processing example of position judgment of a mobile object.
Figure 19:
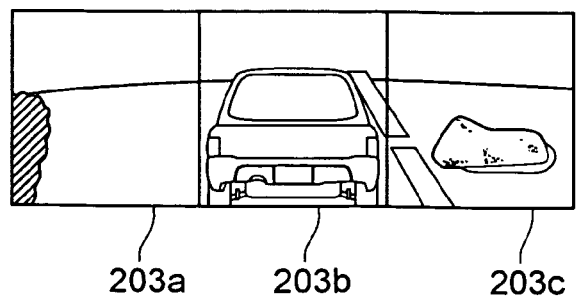
FIG. 19 is a diagram showing an image display example.

FIG. 18 is a diagram for explaining a processing example of position judgment of the mobile object, and shows a part of the XZ plane of the foregoing map. In the illustrated example, among the three areas 202a to 202c, the race car 200 is disposed in area 202b (second area from the left in FIG. 18). Here, as shown in FIG. 19, among the three display devices 203a, 203b, 203c, the image containing the race car 200 is displayed on the display screen of the display device 203b (display screen of the second display device from the left in FIG. 19). An image that does not contain the race car 200 is displayed in the other display devices 203a, 203c.

Figure 20:
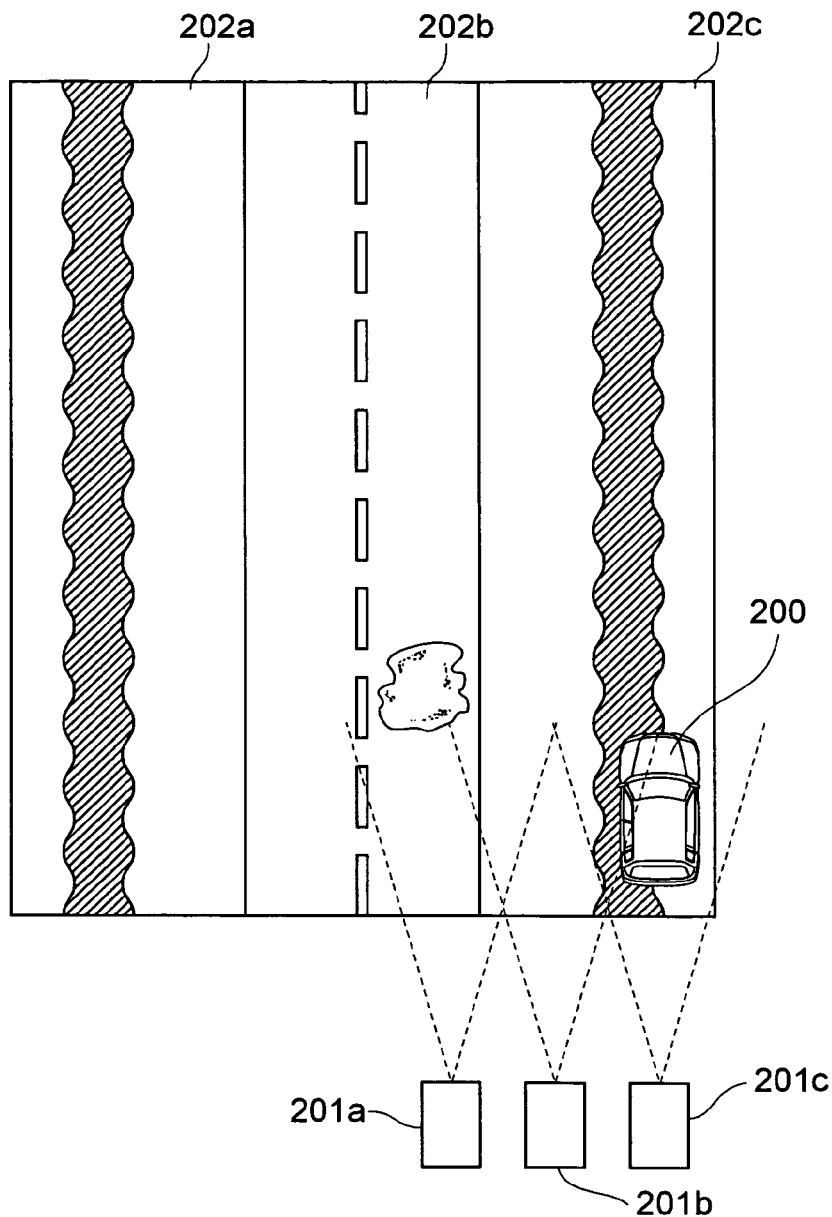
FIG. 20 is a diagram for explaining a processing example of position judgment of a mobile object.
Figure 21:
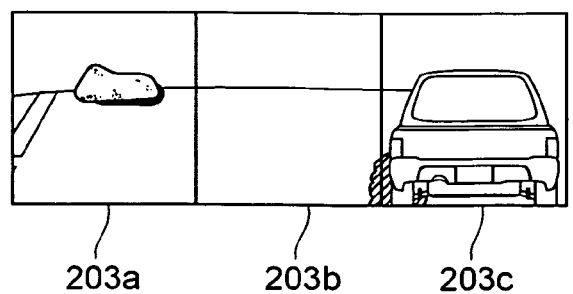
FIG. 21 is a diagram showing an image display example.

FIG. 20 is a diagram for explaining another processing example of position judgment of the mobile object, and shows a part of the XZ plane of the foregoing map. In the illustrated example, among the three areas 202a to 202c, the race car is disposed in area 202c (third area from the left in FIG. 20). Here, as shown in FIG. 21, among the three display devices 203a, 203b, 203c, an image containing the race car 200 is displayed on the display screen of the display device 203c (display screen of the third display device from the left in FIG. 20). An image that does not contain the race car 200 is displayed in the other display devices 203a, 203b.

According to each of the foregoing embodiments, it is possible to dynamically represent the behavior of characters and the like in a game device or the like having a plurality of display screens.

Incidentally, the present invention is not limited to the subject matter described in each of the foregoing embodiments, and may be variously modified within the scope of gist of the present invention. For instance, the applicable scope of the present invention is not limited to the foregoing portable game machine. The present invention is applicable to any device physically having a plurality of display screens, and, for example, may be applied to a stationary videogame device, arcade game device, or a similar image display device such as a simulator, as well as to a portable terminal device, portable telephone or personal computer when used as a game device.

We claim:

1. A non-transitory computer readable recording medium on which is recorded an image processing program for causing a computer to display images of a game using a plurality of display devices, wherein said image processing program causes said computer to perform the steps of:
    (a) setting a virtual boundary in a virtual game space in which a mobile object can move, the virtual game space being larger than a display area defined by the plurality of display devices, the virtual boundary dividing the virtual game space into a plurality of divided game spaces;
    b) judging in which of the divided game spaces an intermediate position between a first display area and a second display area among the display areas corresponding to the respective display devices is positioned; and
    c) displaying the mobile object in the first display area if a result of the judgment indicates that the intermediate position exists in a first divided game space, and switching display area that displays the mobile object from the first display area to the second display area when the intermediate position is moved from the first divided game space into a second divided game space in response to the progress of the game.

2. The recording medium according to claim 1, wherein the intermediate position is a boundary between the first display area and the second display area adjacent to the first display area.

3. A non transitory computer readable recording medium on which is recorded an image processing program for a computer to display displaying images of a game using a plurality of display screens, wherein said image processing program causes said computer to perform the steps of:
    (a) setting a virtual boundary in a two-dimensional or three-dimensional virtual game space in which a mobile object can move, the virtual game space being larger than a display area defined by the plurality of display screens, the virtual boundary dividing the virtual game space into a plurality of divided game spaces;
    (b) judging in which of the divided game spaces an intermediate position between an Nth display screen and another display screen different from the Nth display screen among the display screens is positioned, N being an integral number; and
    (c) displaying the mobile object in the Nth display screen if a result of the judgment indicates that the intermediate position belongs in a first divided game space and switching display area that displays the mobile object from the Nth display screen to the another display screen when the intermediate position is moved from the first divided game space into a second divided game space in response to the progress of the game.

4. The recording medium according to claim 3, wherein the step (c) comprises:
  (c1) generating a first image to be displayed on the Nth display screen, the first image containing the mobile object and corresponding to a partial game space of a first range that includes the position of said mobile object;
  (c2) generating a second image to be displayed on the another display screen, the second image corresponding to another partial game space of a second range successive to the first range; and
  (c3) displaying the first and second images generated at the steps (c1) and (c2) respectively on the Nth display screen and the another display screen,
  wherein the generation of images at said steps (c1) and (c2) is performed with a plurality of image generation units arranged in the same direction as the alignment direction of said plurality of screens.

5. The recording medium according to claim 3, wherein the intermediate position is a boundary between the Nth display screen and the another display screen adjacent to the Nth display screen.

6. An image display device for displaying images of a game using a plurality of display devices, comprising:
  a setting unit configured to set a virtual boundary in a virtual game space in which a mobile object can move, the virtual game space being larger than a display area defined by the plurality of display devices, the virtual boundary dividing the virtual game space into a plurality of divided game spaces;
  a judgment unit configured to judge in which of the divided game spaces an intermediate position between a first display area and a second display area among the display areas corresponding to the respective display devices is positioned; and
  a display control unit configured to display the mobile object in the first display area if a result of the judgment indicates that the intermediate position exists in a first divided game space, and switching display area that displays the mobile object from the first display area to the second display area when the intermediate position is moved from the first divided game space into a second divided game space in response to the progress of the game.

7. The image display device according to claim 6, wherein the intermediate position is a boundary between the first display area and the second display area adjacent to the first display area.

8. An image display device for displaying images of a game using a plurality of display screens, comprising:
  a setting unit configured to set a virtual boundary in a two-dimensional or three-dimensional virtual game space in which a mobile object can move, the virtual game space being larger than a display area defined by the plurality of display screens, the virtual boundary dividing the virtual game space into a plurality of divided game spaces;
  a judgment unit configured to judge in which of the divided game spaces an intermediate position between an Nth display screen and another display screen different from the Nth display screen among the display screens belongs is positioned, N being an integral number; and
  a display control unit configured to display the mobile object in the Nth display screen if a result of the judgment indicates that the intermediate position belongs in a first divided game space and switching display area that displays the mobile object from the Nth display screen to the another display screen when the intermediate position is moved from the first divided game space into a second divided game space in response to the progress of the game.

9. The image display device according to claim 8, further comprising:
  a first image generation unit configured to generate a first image to be displayed on the Nth display screen, the first image containing the mobile object and corresponding to a partial game space of a first range that includes the position of said mobile object; and
  a second image generation unit configured to generate a second image to be displayed on the another display screen, the second image corresponding to another partial game space of a second range successive to the first range,
  wherein said first and second image generation units are arranged in the same direction as the alignment direction of said plurality of display screens.

10. The image display device according to claim 8, wherein the intermediate position is a boundary between the Nth display screen and the another display screen adjacent to the Nth display screen.

* * * * *